United States Patent
Chun et al.

(10) Patent No.: US 9,725,526 B2
(45) Date of Patent: Aug. 8, 2017

(54) MODIFIED CONJUGATED DIENE POLYMER, MODIFIED RUBBER COMPOSITION COMPRISING SAME, AND METHOD FOR PRODUCING MODIFIED CONJUGATED DIENE POLYMER

(71) Applicant: LG Chem, Ltd., Seoul (KR)

(72) Inventors: Moon-Seok Chun, Daejeon (KR); Soo-Yong Lee, Daejeon (KR); Seong-Du Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/119,901

(22) PCT Filed: Jul. 20, 2015

(86) PCT No.: PCT/KR2015/007511
§ 371 (c)(1),
(2) Date: Aug. 18, 2016

(87) PCT Pub. No.: WO2016/017976
PCT Pub. Date: Feb. 4, 2016

(65) Prior Publication Data
US 2017/0066848 A1    Mar. 9, 2017

(30) Foreign Application Priority Data

Jul. 30, 2014  (KR) .................. 10-2014-0097465

(51) Int. Cl.
| | | |
|---|---|---|
| C08C 19/25 | (2006.01) | |
| C08F 36/04 | (2006.01) | |
| C08F 2/14 | (2006.01) | |
| C08F 236/10 | (2006.01) | |
| C08F 8/42 | (2006.01) | |
| C08F 36/06 | (2006.01) | |
| C08C 19/22 | (2006.01) | |
| C08C 19/44 | (2006.01) | |
| C08K 3/36 | (2006.01) | |

(52) U.S. Cl.
CPC .............. *C08C 19/25* (2013.01); *C08C 19/22* (2013.01); *C08C 19/44* (2013.01); *C08F 2/14* (2013.01); *C08F 8/42* (2013.01); *C08F 36/04* (2013.01); *C08F 36/06* (2013.01); *C08F 236/10* (2013.01); *C08K 3/36* (2013.01); *C08F 2500/17* (2013.01); *C08F 2500/21* (2013.01)

(58) Field of Classification Search
None
See application file for complete search history.

(56) References Cited

U.S. PATENT DOCUMENTS

| | | | | |
|---|---|---|---|---|
| 3,644,314 A * | 2/1972 | Shiro et al. | ........... | C08F 236/10 502/155 |
| 3,644,322 A * | 2/1972 | Farrar | ........... | C07F 1/02 502/157 |
| 3,652,516 A * | 3/1972 | Farrar | ........... | C08F 12/08 502/157 |
| 3,847,834 A * | 11/1974 | Dennis | ........... | C07F 1/00 260/665 R |
| 3,954,894 A * | 5/1976 | Kamienski | ........... | C08F 4/488 260/665 R |
| 4,067,917 A * | 1/1978 | Sigwalt | ........... | C07F 1/02 260/665 R |
| 4,172,190 A * | 10/1979 | Tung | ........... | C08F 4/488 260/665 R |
| 4,957,976 A | 9/1990 | Takao et al. | | |
| 5,231,152 A * | 7/1993 | Roggeman | ........... | C08F 236/10 502/157 |
| 5,567,815 A * | 10/1996 | Hall | ........... | C07F 1/02 502/157 |
| 7,285,596 B2 * | 10/2007 | Willis | ........... | C07F 1/02 525/242 |
| 9,290,585 B2 * | 3/2016 | Lee | ........... | C08F 236/10 |
| 9,422,417 B1 * | 8/2016 | Lee | ........... | C08F 236/10 |
| 2002/0035294 A1 * | 3/2002 | Halasa | ........... | B60C 1/0016 564/328 |
| 2002/0198343 A1 * | 12/2002 | Willis | ........... | C08F 12/04 526/173 |

(Continued)

FOREIGN PATENT DOCUMENTS

| | | |
|---|---|---|
| JP | 06053768 B2 | 7/1994 |
| JP | 2006241358 A | 9/2006 |
| JP | 4810567 B2 | 11/2011 |
| JP | 2012207234 A | 10/2012 |
| JP | 6053768 B2 | 12/2016 |
| KR | 20050091988 A | 9/2005 |
| KR | 20090122472 A | 11/2009 |
| KR | 20140007373 A | 1/2014 |
| WO | 2013096300 A2 | 6/2013 |
| WO | 2014014052 A1 | 1/2014 |

OTHER PUBLICATIONS

International Search Report from PCT/KR2015/007511, dated Oct. 16, 2015.

(Continued)

*Primary Examiner* — Robert S Loewe
(74) *Attorney, Agent, or Firm* — Lerner, David, Littenberg, Krumholz & Mentlik, LLP

(57) ABSTRACT

Disclosed are a method of preparing a modified conjugated diene-based polymer, a modified conjugated diene-based polymer prepared thereby, and a rubber composition and a tire, including the modified conjugated diene-based polymer. The method of preparing the modified conjugated diene-based polymer includes (a) polymerizing a vinyl aromatic monomer and a conjugated diene monomer using an organo-alkali metal compound in the presence of a hydrocarbon solvent, thus forming an active polymer having an alkali metal end and (b) coupling or linking the active polymer having the alkali metal end with a compound represented by Chemical Formula 1.

18 Claims, No Drawings

(56) References Cited

U.S. PATENT DOCUMENTS

| | | | |
|---|---|---|---|
| 2004/0254301 A1* | 12/2004 | Tsukimawashi | B60C 1/00 525/271 |
| 2007/0293620 A1* | 12/2007 | Yan | C08C 19/44 524/528 |
| 2008/0103261 A1* | 5/2008 | Tanaka | B60C 1/0016 525/331.9 |
| 2008/0319151 A1 | 12/2008 | Oshima | |
| 2009/0036567 A1 | 2/2009 | Oshima et al. | |
| 2009/0163668 A1* | 6/2009 | Yamada | C08C 19/44 525/331.9 |
| 2009/0239974 A1 | 9/2009 | Mori et al. | |
| 2010/0113683 A1 | 5/2010 | Matsumoto et al. | |
| 2010/0130671 A1* | 5/2010 | Tadaki | B60C 1/0016 524/547 |
| 2010/0144954 A1 | 6/2010 | Kikuchi et al. | |
| 2011/0172344 A1* | 7/2011 | Yoshida | B60C 1/00 524/493 |
| 2011/0207847 A1* | 8/2011 | Sasaka | B60C 1/0016 523/157 |
| 2012/0101212 A1* | 4/2012 | Yoon | C07F 7/1836 524/534 |
| 2012/0172491 A1* | 7/2012 | Miyazaki | B60C 1/0016 523/157 |
| 2012/0270997 A1* | 10/2012 | Tanaka | B60C 1/00 524/572 |
| 2013/0085228 A1* | 4/2013 | Tanaka | C08C 19/25 524/572 |
| 2013/0160443 A1 | 6/2013 | Ballweg et al. | |
| 2013/0296481 A1 | 11/2013 | Tanaka | |
| 2013/0324667 A1* | 12/2013 | Yuasa | B60C 1/0016 525/192 |
| 2014/0128467 A1 | 5/2014 | Papathanassiu | |
| 2014/0163163 A1* | 6/2014 | Lee | C07D 213/16 524/575 |
| 2014/0371383 A1* | 12/2014 | Hayata | C08K 3/36 524/548 |
| 2015/0183914 A1 | 7/2015 | Kawai et al. | |

OTHER PUBLICATIONS

Extended Search Report from European Application No. 15828006.5, dated Nov. 24, 2016.

* cited by examiner

MODIFIED CONJUGATED DIENE POLYMER, MODIFIED RUBBER COMPOSITION COMPRISING SAME, AND METHOD FOR PRODUCING MODIFIED CONJUGATED DIENE POLYMER

CROSS-REFERENCE TO RELATED APPLICATION

This application is a national phase entry under 35 U.S.C. §371 of International Application No. PCT/KR2015/007511, filed Jul. 20, 2015, which claims priority to Korean Patent Application No. 10-2014-0097465, filed Jul. 30, 2014, the disclosures of which are incorporated herein by reference.

TECHNICAL FIELD

The present invention relates to a modified conjugated diene-based polymer, a modified rubber composition comprising the same, and a method of preparing the same and, more particularly, to a modified conjugated diene-based polymer containing a rubber component and a reinforcing agent, a modified rubber composition comprising the modified conjugated diene-based polymer, and a method of preparing the modified conjugated diene-based polymer, in which the rubber component includes diene-based rubber having high tensile strength, wear resistance, and wet skid resistance, as well as improved heat build-up when mixed with silica as the reinforcing agent.

BACKGROUND ART

Recently, the demand for vehicles to exhibit increased stability, durability and fuel economy is ongoing. Accordingly, there is a need to develop rubber having high wet skid resistance and mechanical strength and low rolling resistance, as a material for vehicle tires, especially tire treads, which are in contact with roads.

Conventional tire treads are manufactured by mixing conjugated diene-based rubber with an inorganic filler to improve the above properties, but suffer from high hysteresis loss or low dispersibility.

In this regard, for example, Korean Patent Application Publication No. 2005-0091988 discloses a modified polymer having high resilience and thus superior fuel economy, but the effect thereof is insufficient.

DISCLOSURE

Technical Problem

Accordingly, the present invention has been made keeping in mind the above problems encountered in the related art, and an object of the present invention is to provide a method of preparing a modified conjugated diene-based copolymer, which may exhibit high modification efficiency and superior processability compared to those prepared through conventional preparation processes.

Technical Solution

In order to accomplish the above object, the present invention provides a method of preparing a modified conjugated diene-based polymer, comprising: (a) polymerizing a conjugated diene monomer, or a vinyl aromatic monomer and a conjugated diene monomer, using an organo-alkali metal compound in the presence of a hydrocarbon solvent, thus forming an active polymer having an alkali metal end; and (b) coupling or linking the active polymer having the alkali metal end with a compound represented by Chemical Formula 1 below:

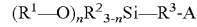  [Chemical Formula 1]

wherein $R^1$ is a C1-C20 hydrocarbon containing at least one oxygen or nitrogen, $R^2$ an $R^3$ are each a C1-C20 hydrocarbon, A is an amine, and n is an integer of 1 to 3; when n is 2 or 3, two or three $R^1$s are identical to or different from each other; and when n is 1, two $R^2$s are identical to or different from each other.

In addition, the present invention provides a modified conjugated diene-based polymer, which is configured such that the end of a random copolymer comprising a conjugated diene monomer and a vinyl aromatic monomer is modified with a compound represented by Chemical Formula 1.

In addition, the present invention provides a modified conjugated diene-based polymer, which is configured such that the end of an active polymer comprising a conjugated diene monomer is modified with a compound represented by Chemical Formula 1.

In addition, the present invention provides a modified conjugated diene-based polymer rubber composition, comprising the modified conjugated diene-based polymer.

In addition, the present invention provides a tire, comprising the modified conjugated diene-based polymer rubber composition.

Advantageous Effects

According to the present invention, the method of preparing a modified conjugated diene-based polymer enables the production of a modified conjugated diene-based polymer, which exhibits high modification efficiency compared to those prepared through conventional preparation processes, and also, has high tensile strength, wear resistance, and wet skid resistance, as well as improved heat build-up when mixed with silica as a reinforcing agent.

BEST MODE

Hereinafter, a detailed description will be given of a method of preparing a modified conjugated diene-based polymer, a modified conjugated diene-based polymer prepared thereby, and modified rubber including the modified conjugated diene-based polymer, according to the present invention.

According to the present invention, the method of preparing a modified conjugated diene-based polymer comprises: (a) polymerizing a conjugated diene monomer, or a vinyl aromatic monomer and a conjugated diene monomer, using an organo-alkali metal compound in the presence of a hydrocarbon solvent, thus forming an active polymer having an alkali metal end; and (b) coupling or linking the active polymer having the alkali metal end with a compound represented by Chemical Formula 1 below.

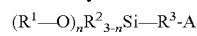  [Chemical Formula 1]

wherein $R^1$ is a C1-C20 hydrocarbon containing at least one oxygen or nitrogen, $R^2$ an $R^3$ are each a C1-C20 hydrocarbon, A is an amine, and n is an integer of 1 to 3; when n is 2 or 3, two or three $R^1$s are identical to or different from each other; and when n is 1, two $R^2$s are identical to or different from each other.

In the method of preparing the modified conjugated diene-based polymer according to the present invention, a homopolymer may be obtained by polymerizing the conjugated diene monomer alone, or a random copolymer may be obtained by copolymerizing the vinyl aromatic monomer and the conjugated diene monomer.

The conjugated diene monomer may include at least one selected from the group consisting of 1,3-butadiene, 2,3-dimethyl-1,3-butadiene, piperylene, 3-butyl-1,3-octadiene, isoprene, and 2-phenyl-1,3-butadiene. The conjugated diene monomer may be used in an amount of 60 to 100 wt %, preferably 60 to 85 wt %, and more preferably 60 to 80 wt %, based on 100 wt % in total of the conjugated diene monomer and the aromatic vinyl monomer. When the conjugated diene monomer is used in an amount of 100 wt % based on 100 wt % in total of the conjugated diene monomer and the aromatic vinyl monomer, an active polymer resulting from polymerizing only the conjugated diene monomer, without the aromatic vinyl monomer, is formed.

The vinyl aromatic monomer may include at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene. Preferably useful is styrene or α-methylstyrene. The vinyl aromatic monomer may be used in an amount of 0 to 40 wt %, preferably 15 to 40 wt %, and more preferably 20 to 40 wt %, based on 100 wt % in total of the conjugated diene monomer and the aromatic vinyl monomer. When the vinyl aromatic monomer is used in an amount of 0 wt % based on 100 wt % in total of the conjugated diene monomer and the aromatic vinyl monomer, an active polymer resulting from polymerizing only the conjugated diene monomer, without the aromatic vinyl monomer, is formed.

The hydrocarbon solvent may be a hydrocarbon, or may include at least one selected from the group consisting of n-pentane, n-hexane, n-heptane, isooctane, cyclohexane, toluene, benzene, and xylene, but the present invention is not necessarily limited thereto.

As used herein, the active polymer having an alkali metal end refers to a polymer comprising a polymer anion and an alkali metal cation, which are coupled with each other.

The active polymer having an alkali metal end may be a random copolymer comprising a conjugated diene monomer and a vinyl aromatic monomer.

In the method of preparing the modified conjugated diene-based polymer according to the present invention, the polymerizing in (a) may be performed with the additional use of a polar additive.

The polar additive may be a base, or may include ether, amine or mixtures thereof. Specifically, it may be selected from the group consisting of tetrahydrofuran, ditetrahydrofurylpropane, diethylether, cycloamylether, dipropylether, ethylenedimethylether, ethylenedimethylether, diethyleneglycol, dimethylether, tert-butoxyethoxyethane bis(2-dimethylaminoethyl)ether, (dimethylaminoethyl)ethylether, trimethylamine, triethylamine, tripropylamine, and tetramethylethylenediamine. Preferably useful is ditetrahydropropylpropane, triethylamine, or tetramethylethylenediamine.

The polar additive may be used in an amount of 0.001 to 50 g, preferably 0.001 to 10 g, and more preferably 0.005 to 1 g, based on 100 g in total of the added monomer.

The polar additive may be used in an amount of 0.001 to 10 g, preferably 0.005 to 1 g, and more preferably 0.005 to 0.1 g, based on 1 mmol in total of the added organo-alkali metal compound.

When the conjugated diene monomer and the aromatic vinyl monomer are copolymerized, a block copolymer may be easily prepared due to the difference in the reaction rates therebetween. However, when the polar additive is added, the low reaction rate of the vinyl aromatic compound may be increased to thus obtain the microstructure of the corresponding copolymer, for example, a random copolymer.

In (a), the polymerization may be exemplified by anionic polymerization.

Particularly, the polymerization in (a) may be living anionic polymerization, in which an active end is obtained through a growth reaction involving anions.

Also, the polymerization in (a) may be either high-temperature polymerization or room-temperature polymerization.

High-temperature polymerization is a polymerization process that comprises adding the organometallic compound and then applying heat to increase the reaction temperature, and room-temperature polymerization is a polymerization process that takes place in such a way that heat is not applied after the organometallic compound is added.

The polymerization in (a) may take place at a temperature ranging from −20 to 200° C., preferably 0 to 150° C., and more preferably 10 to 120° C.

Also, b) may be performed at 0 to 90° C. for 1 min to 5 hr.

The method of preparing the modified conjugated diene-based polymer according to the present invention may be carried out in a batch manner, or alternatively in a continuous manner using a single reactor or at least two reactors.

The organo-alkali metal compound may be used in an amount of 0.01 to 10 mmol, preferably 0.05 to 5 mmol, and more preferably 0.1 to 2 mmol, based on 100 g in total of the monomer.

The molar ratio of the organo-alkali metal compound and the compound represented by Chemical Formula 1 may range from 1:0.1 to 1:10, or 1:0.5 to 1:2.

According to the present invention, the method of preparing the modified conjugated diene-based polymer may be carried out in a batch manner, or alternatively in a continuous manner using a single reactor or at least two reactors.

In addition, the present invention addresses a modified conjugated diene-based polymer prepared by the above method.

The modified conjugated diene-based polymer may be, for example, a homopolymer composed exclusively of a conjugated diene monomer, or a random copolymer comprising a conjugated diene monomer and an aromatic vinyl monomer. The end of the active polymer comprising the conjugated diene monomer may be modified with the compound represented by Chemical Formula 1, and the end of the random copolymer comprising the conjugated diene monomer and the vinyl aromatic monomer may be modified with the compound represented by Chemical Formula 1.

The chain comprising the conjugated diene monomer and the aromatic vinyl monomer may include the vinyl aromatic monomer in an amount of 0 to 40 wt %, preferably 15 to 40 wt %, and more preferably 20 to 40 wt %, based on 100 wt % in total of the conjugated diene monomer and the aromatic vinyl monomer. When the vinyl aromatic monomer is used in an amount of 0 wt % based on 100 wt % in total of the conjugated diene monomer and the aromatic vinyl monomer, an active polymer resulting from polymerizing only the conjugated diene monomer, without the aromatic vinyl monomer, is formed.

The modified conjugated diene-based polymer may have a Mooney viscosity of 20 or more, preferably from 30 to 150, and more preferably 40 to 120.

The modified conjugated diene-based polymer may have a number average molecular weight of 1,000 to 2,000,000 g/mol, preferably 10,000 to 1,000,000 g/mol, and more preferably 100,000 to 500,000 g/mol.

The modified conjugated diene-based polymer may have a vinyl content of 18 wt % or more, preferably 25 wt % or more, and more preferably 30 to 70 wt %. Given the above vinyl content range, the glass transition temperature of the polymer may be elevated. Thus, when such a polymer is applied to tires, the properties required of tires, such as running resistance and wet grip, may be satisfied, and superior fuel economy may result.

The vinyl content refers to the amount of a monomer having a vinyl group, or the amount of 1,2-added conjugated diene monomer rather than the amount of 1,4-added conjugated diene monomer, based on 100 wt % of the conjugated diene monomer.

The modified conjugated diene-based polymer may have a polydispersity index (PDI) of 0.5 to 10, preferably 0.5 to 5, and more preferably 1.0 to 2.0.

The modified conjugated diene-based polymer may exhibit viscoelastic properties. When measured at 10 Hz using DMA after mixing with silica, Tan δ at 0° C. may be in the range of 0.6 to 1 or 0.9 to 1. Given the above Tan δ range, desired skid resistance or wet resistance may be obtained.

Also, Tan δ at 60° C. may be in the range of 0.06 to 0.09 or 0.07 to 0.08. Given the above Tan δ range, desired rolling resistance or rotational resistance (RR) may be obtained.

In addition, the present invention addresses a modified conjugated diene-based polymer rubber composition comprising 0.1 to 200 parts by weight of an inorganic filler based on 100 parts by weight of the modified conjugated diene-based polymer.

The amount of the inorganic filler may be 10 to 150 parts by weight or 50 to 100 parts by weight.

The inorganic filler may include carbon black, silica, or a mixture thereof.

The inorganic filler may be silica. As such, dispersibility is significantly increased, and the end of the modified conjugated diene-based polymer of the invention may be coupled (capped) with silica particles, thus significantly decreasing hysteresis loss.

The modified conjugated diene-based polymer rubber composition may further comprise an additional conjugated diene-based polymer.

Examples of the additional conjugated diene-based polymer may include SBR (styrene-butadiene rubber), BR (butadiene rubber), natural rubber, and mixtures thereof.

SBR may be exemplified by SSBR (solution styrene-butadiene rubber).

The modified conjugated diene-based polymer rubber composition according to the present invention may comprise 20 to 100 parts by weight of the modified conjugated diene-based polymer and 0 to 80 parts by weight of the additional conjugated diene-based polymer.

Alternatively, the modified conjugated diene-based polymer rubber composition according to the present invention may comprise 20 to 99 parts by weight of the modified conjugated diene-based polymer and 1 to 80 parts by weight of the additional conjugated diene-based polymer.

Alternatively, the modified conjugated diene-based polymer rubber composition according to the present invention may comprise 10 to 100 parts by weight of the modified conjugated diene-based polymer, 0 to 90 parts by weight of the additional conjugated diene-based polymer, 0 to 100 parts by weight of carbon black, 5 to 200 parts by weight of silica, and 2 to 20 parts by weight of a silane coupling agent.

Alternatively, the modified conjugated diene-based polymer rubber composition according to the present invention may comprise 10 to 100 parts by weight of the modified conjugated diene-based polymer, 0 to 90 parts by weight of the additional conjugated diene-based polymer, 0 to 100 parts by weight of carbon black, 5 to 200 parts by weight of silica, and 2 to 20 parts by weight of a silane coupling agent, in which the total weight of the modified conjugated diene-based polymer and the additional conjugated diene-based polymer may be 100 parts by weight.

Alternatively, the modified conjugated diene-based polymer rubber composition according to the present invention may comprise 100 parts by weight of a polymer mixture comprising 10 to 99 wt % of the modified conjugated diene-based polymer and 1 to 90 wt % of the additional conjugated diene-based polymer, 1 to 100 parts by weight of carbon black, 5 to 200 parts by weight of silica, and 2 to 20 parts by weight of a silane coupling agent.

Also, the modified conjugated diene-based polymer rubber composition according to the present invention may further comprise 1 to 100 parts by weight of oil.

The oil may be exemplified by mineral oil or a softener.

The oil may be used in an amount of 10 to 100 parts by weight or 20 to 80 parts by weight based on 100 parts by weight of the conjugated diene-based copolymer. Given the above oil content range, desired properties may be exhibited, and the rubber composition may be appropriately softened, thus increasing processability.

The modified conjugated diene-based polymer rubber composition may be used to manufacture, for example, a tire or a tire tread.

According to the present invention, a tire is manufactured using the modified conjugated diene-based polymer rubber composition.

A better understanding of the present invention may be obtained via the following examples, which are merely set forth to illustrate the present invention, and those skilled in the art will appreciate that various changes and modifications are possible, without departing from the scope and spirit of the invention as disclosed in the accompanying claims.

Mode for Invention

EXAMPLE

Preparation of Modified Conjugated Diene-Based Polymer

Example 1

A 10 L reactor with a stirrer and a jacket was preliminarily dried with nitrogen, after which 777 g of butadiene, 273 g of styrene, 4800 g of hexane, and 0.85 g of TMEDA as a polar material were placed in the reactor without impurities, and the temperature inside the reactor was maintained at 50° C.

As a polymerization initiator, n-butyllithium (Chemetal) was fed into the reactor in an amount of 10.5 mmol based on the amount of lithium. After the initiation of the reaction, the temperature inside the reactor began to rise due to the heat generated due to the polymerization, and thus the final temperature inside the reactor reached 80° C. After the termination of the polymerization, 5.25 mmol of a modifier compound (N,N-diethyl-3-(7-methyl-3,6,8,11-tetraoxa-7-silatridecan-7-yl)propan-1-amine) was placed in the reactor, and a modification reaction was carried out for 5 min at a temperature of 80° C. The resulting polymer solution was added with 2.1 g of 2,6-di-t-butyl-p-cresol (BHT) as an antioxidant, followed by steam stripping to remove the solvent and then drying in an oven, yielding a sample (styrene-butadiene copolymer) having a modified component.

Based on the results of analysis of the amounts of bound styrene monomer and vinyl of the copolymer using a Varian VNMRS 500 Mhz NMR, the amount of bound styrene was found to be 36 mass % and the amount of bound butadiene was found to be 64 mass %. Also, the amount of bound 1,2-vinyl of the microstructure in the butadiene was 26% relative to the total mass of the butadiene chain, based on the calculated results, rather than the results of measurement using an IR spectrophotometer. Also, the sample had a Mooney viscosity of 90.

Comparative Example 1

A sample (styrene-butadiene copolymer) having a modified component was obtained in the same manner as in Example 1, with the exception that 3-(diethoxy(methyl)silyl)-N,N-diethylpropan-1-amine (Modifier B) was used in lieu of Modifier A in the same equivalent amount. Based on the results of analysis of the amounts of bound styrene monomer and vinyl of the copolymer using a Varian VNMRS 500 Mhz NMR, the amount of bound styrene was found to be 36 mass % and the amount of bound butadiene was found to be 64 mass %. Also, the amount of bound 1,2-vinyl of the microstructure in the butadiene was 26% relative to the total mass of the butadiene chain, based on the calculated results, rather than the results of measurement using an IR spectrophotometer. Also, the sample had a Mooney viscosity of 92.

Test Example

The modified conjugated diene-based polymers of the example and comparative example were measured for Mooney viscosity, modification efficiency, molecular weight distribution via GPC, RR, wet grip, and processability. The results are shown in Table 1 below.

1. Measurement of Mooney Viscosity

The viscosity of rubber was measured using a Mooney viscometer (ALPHA Technologies, Mooney MV 2000). For this, a rubber sample weighing 25 to 30 g was measured at 100° C. using a large rotor with a preheating time of 1 min and a testing time of 4 min [$ML_{1+4}$(100° C.)].

2. Measurement of Modification Efficiency

The modification efficiency was measured using a bound rubber measurement method. Specifically, about 0.2 g of the mixture, resulting from secondary kneading, was cut into the shape of a cube, each side of which was about 1 mm, placed in a 100-mesh stainless steel screen box to measure the weight thereof, immersed in toluene for 24 hr, and dried, after which the weight thereof was measured.

The amount of filler-bound rubber was calculated from the amount of the component that was not dissolved but remained, thus determining the ratio of the amount of filler-bound rubber relative to the amount of rubber in the first mixture. The value thus determined was used as the modification efficiency.

A more detailed description thereof is as follows.

1) A cubic box having a volume of 1 cm$^3$ (1 cm×1 cm×1 cm) was made of a 100-mesh stainless steel screen. The weight thereof was accurately measured to the third decimal place (Wo).

2) About 1 g of a cured rubber sample was uniformly cut to a size of 1 mm×1 mm×1 mm, and then the weight thereof was accurately measured to the third decimal place (W1).

3) The rubber sample was carefully placed in the cubic mesh box and then covered with a lid so as to prevent the loss of the sample.

4) 1000 cc of toluene was placed in a 2 L glass bottle (having a rectangular parallelepiped shape), and the mesh box containing the sample was immersed in the toluene bottle. The sample box was located at a central position in the solution.

5) The sample immersed in the solution was allowed to stand for 14 days. Here, care was taken to avoid stirring the solution, attributable to the transfer or shaking of the bottle.

6) After 14 days, the mesh box containing the sample was taken out of the solution and then dried in a vacuum oven at 140° C. for 35 min.

7) The weight of the dried sample (mesh box+sample) was measured (W2).

8) (W2−Wo) was calculated, thus determining the amount of the sample remaining after extraction (W3).

9) The amount of rubber and the amount of inorganic material contained in W1 were calculated (the amounts of rubber and inorganic filler contained in 1 g of compound were calculated using the mixing recipe).

(Theoretical amount of rubber=W4, Theoretical amount of inorganic material=W5)

10) The amount of B-rubber was calculated.

$$B\text{-rubber \%}=[(W3-W5)/(W4)]*100$$

3. Molecular weight (Mw, Mn) and Polydispersity Index (PDI)

The molecular weight (Mw: weight average molecular weight, Mn: number average molecular weight) and polydispersity index (PDI: Mw/Mn) were measured using GPC (Gel Permeation Chromatography). GPC was performed using equipment including a Waters 2707 autosampler, a Waters 2414 Refractive index detector, and a Waters 1515 Isocratic HPLC pump. The developing solvent for GPC was prepared by adding tetrahydrofuran (THF, Fisher T425-4) with 2 wt % of TMEDA (Tetramethylethylenediamine). The sample (formed by dissolving 4 mg of the polymer in 4 mL of THF) was prepared through complete dissolution using a stirrer. The sample thus prepared was fed using an automatic sampler at a flow rate of 1 ml/min. As such, the temperatures inside and outside the column were 40° C. The total analysis time per sample was 45 min, and information for Mn, Mw, and PDI was collected from the acquired data through Waters analysis programs.

4. Rolling Resistance (RR) and Wet Grip

The RR and wet grip of rubber were measured using DMTS (Dynamic mechanical thermal spectrometry; GABO, EPLEXOR 500N). The measurement conditions were as follows: frequency: 10 Hz, strain (static strain: 3%, dynamic strain: 0.25%), and temperature: −60 to 70° C. As such, RR was determined based on Tan δ at 60° C., and wet grip was determined based on Tan δ at 0° C. These values were represented as indexes relative to the value of Comparative Example 1, which was set to 100.

5. Concentration of Generated Alcohol Vapor

The concentration of generated alcohol vapor was analyzed by collecting vapor that was generated when the rubber mixture was stirred using a stirrer (a Banbury® Mixer) in the mixing process and measuring the amount of alcohol that was generated through gas chromatography.

TABLE 1

|  | Ex. 1 | Comp. Ex. 1 |
| --- | --- | --- |
| Initiator | n-butyllithium | n-butyllithium |
| Modifier | Modifier A | Modifier B |
| Mooney viscosity | 90 | 92 |
| Modification efficiency | 90 | 91 |
| RR index | 103 | 100 |
| Wet index | 101 | 100 |
| Generated alcohol vapor ppm | Not detected | 10 |

As is apparent from Table 1, in the modified conjugated diene-based polymer composition of the example (using Modifier A), compared to the composition of Comparative Example 1 using Modifier B, the amount of bound rubber was increased in the silica-mixed composition, silica dispersibility was increased, and RR based on Tan δ at 60° C. was significantly decreased, thereby reducing hysteresis loss, resulting in superior fuel economy. Also, the generation of alcohol vapor was significantly reduced in the mixing process, thus realizing a good working environment and increasing processing stability.

The invention claimed is:

1. A method of preparing a modified conjugated diene-based polymer, comprising:
    (a) polymerizing a conjugated diene monomer, or a vinyl aromatic monomer and a conjugated diene monomer, using an organo-alkali metal compound in presence of a hydrocarbon solvent, thus forming an active polymer having an alkali metal end; and
    (b) coupling or linking the active polymer having the alkali metal end with a compound represented by Chemical Formula 1 below:

$(R^1—O)_n R^2{}_{3-n}Si—R^3-A$       [Chemical Formula 1]

wherein $R^1$ is a C1-C20 hydrocarbon containing at least one oxygen or nitrogen, $R^2$ and $R^3$ are each a C1-C20 hydrocarbon, A is an amine, and n is an integer of 1 to 3; when n is 2 or 3, two or three $R^1$s are identical to or different from each other; and when n is 1, two $R^2$s are identical to or different from each other.

2. The method of claim 1, wherein the active polymer is a random copolymer comprising the conjugated diene monomer and the vinyl aromatic monomer.

3. The method of claim 2, wherein the random copolymer contains the conjugated diene monomer and the vinyl aromatic monomer in a ratio ranging from 90:10 to 60:40.

4. The method of claim 1, wherein the active polymer contains the conjugated diene monomer and the vinyl aromatic monomer in a ratio ranging from 100:0 to 60:40.

5. The method of claim 1, wherein the organo-alkali metal compound is used in an amount of 0.01 to 10 mmol based in 100 g in total of the monomer.

6. The method of claim 1, wherein a molar ratio of the organo-alkali metal compound and the compound represented by Chemical Formula 1 is 1:0.1 to 1:10.

7. The method of claim 1, wherein the polymerizing in (a) is performed with additional use of a polar additive.

8. The method of claim 7, wherein the polar additive is added in an amount of 0.001 to 50 g based on 1 mmol in total of the organo-alkali metal compound.

9. A modified conjugated diene-based polymer, which is configured such that an end of a random copolymer comprising a conjugated diene monomer and a vinyl aromatic monomer is modified with a compound represented by Chemical Formula 1 below:

$(R^1—O)_n R^2{}_{3-n}Si—R^3-A$       [Chemical Formula 1]

wherein $R^1$ is a C1-C20 hydrocarbon containing at least one oxygen or nitrogen, $R^2$ and $R^3$ are each a C1-C20 hydrocarbon, A is an amine, and n is an integer of 1 to 3; when n is 2 or 3, two or three $R^1$s are identical to or different from each other; and when n is 1, two $R^2$s are identical to or different from each other.

10. The modified conjugated diene-based polymer of claim 9, wherein the random copolymer contains the conjugated diene monomer and the vinyl aromatic monomer in a ratio ranging from 90:10 to 60:40.

11. A modified conjugated diene-based polymer rubber composition, comprising the modified conjugated diene-based polymer of claim 9.

12. The modified conjugated diene-based polymer rubber composition of claim 11, wherein the modified rubber composition comprises 20 to 90 wt % of the modified conjugated diene-based polymer based on a total weight of the composition.

13. The modified conjugated diene-based polymer rubber composition of claim 11, wherein the modified rubber composition comprises 0.1 to 200 parts by weight of an inorganic filler based on 100 parts by weight of the modified conjugated diene-based polymer.

14. The modified conjugated diene-based polymer rubber composition of claim 13, wherein the inorganic filler is silica.

15. A tire, comprising the modified conjugated diene-based polymer of claim 9.

16. A modified conjugated diene-based polymer, which is configured such that an end of an active polymer comprising a conjugated diene monomer is modified with a compound represented by Chemical Formula 1 below:

$(R^1—O)_n R^2{}_{3-n}Si—R^3-A$       [Chemical Formula 1]

wherein $R^1$ is a C1-C20 hydrocarbon containing at least one oxygen or nitrogen, $R^2$ and $R^3$ are each a C1-C20 hydrocarbon, A is an amine, and n is an integer of 1 to 3; when n is 2 or 3, two or three $R^1$s are identical to or different from each other; and when n is 1, two $R^2$s are identical to or different from each other.

17. A modified conjugated diene-based polymer rubber composition, comprising the modified conjugated diene-based polymer of claim 16.

18. A tire, comprising the modified conjugated diene-based polymer of claim 16.

* * * * *